(12) United States Patent  
Wang

(10) Patent No.: US 10,367,670 B2  
(45) Date of Patent: Jul. 30, 2019

(54) METHOD AND APPARATUS FOR CREST FACTOR REDUCTION

(71) Applicant: TELEFONAKTIEBOLAGET LM ERICSSON (PUBL), Stockholm (SE)

(72) Inventor: Zhancang Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 172 days.

(21) Appl. No.: 15/514,855

(22) PCT Filed: Jan. 25, 2017

(86) PCT No.: PCT/CN2017/072620  
§ 371 (c)(1),  
(2) Date: Mar. 28, 2017

(87) PCT Pub. No.: WO2018/137175  
PCT Pub. Date: Aug. 2, 2018

(65) Prior Publication Data  
US 2018/0359126 A1    Dec. 13, 2018

(51) Int. Cl.  
*H04L 25/03* (2006.01)  
*H04L 27/26* (2006.01)

(52) U.S. Cl.  
CPC .... *H04L 27/2623* (2013.01); *H04L 25/03853* (2013.01); *H04L 27/2618* (2013.01); *H04L 27/2624* (2013.01)

(58) Field of Classification Search  
CPC .............. H04B 1/0475; H04L 27/2623; H04L 25/03853  
See application file for complete search history.

(56) References Cited

U.S. PATENT DOCUMENTS

| 8,259,846 | B2 | 9/2012 | Liang et al. |
| 8,619,903 | B2 | 12/2013 | Schmidt et al. |
| 9,014,319 | B1 | 4/2015 | Copeland |

(Continued)

FOREIGN PATENT DOCUMENTS

| CN | 102111368 A | 6/2011 |
| CN | 101640660 B | 10/2012 |

(Continued)

OTHER PUBLICATIONS

International Search Report and Written Opinion issued in Application No. PCT/CN2017/072620 dated Oct. 27, 2017, 11 pages.

*Primary Examiner* — Sung S Ahn  
(74) *Attorney, Agent, or Firm* — Rothwell, Figg, Ernst & Manbeck, p.c.

(57) ABSTRACT

A method and apparatus in a communication system. The method includes: detecting multiple signal peaks of a target exceeding a predetermined threshold magnitude set to constitute one or more peak clusters; generating one or more noise shaping pulse clusters; assigning one or more noise shaping pulse clusters to the detected signal peaks in one or more peak clusters to clip the detected signal peaks in frequency domain; calculating an output signal based on the clipped signal peaks; the noise shaping pulse cluster comprises multiple sub-noise shaping pulses, bandwidths of the multiple sub-noise-shaping pulses are overlapped and a bandwidth of the noise shaping pulse cluster is greater than the bandwidth of the target signal.

20 Claims, 10 Drawing Sheets

(56) References Cited

U.S. PATENT DOCUMENTS

| | | | |
|---|---|---|---|
| 9,054,928 B1 | 6/2015 | Copeland | |
| 9,077,408 B1 | 7/2015 | Sapuan Sahori et al. | |
| 9,485,129 B1* | 11/2016 | Cope | H04L 27/2623 |
| 2005/0118966 A1 | 6/2005 | Anvari | |
| 2007/0129026 A1 | 6/2007 | Marsili | |
| 2009/0149152 A1 | 6/2009 | Porco et al. | |
| 2010/0027690 A1 | 2/2010 | Liang et al. | |
| 2010/0246714 A1 | 9/2010 | Yang et al. | |
| 2011/0228872 A1* | 9/2011 | Soler Garrido | H04L 27/2623 |
| | | | 375/295 |
| 2014/0044215 A1* | 2/2014 | Mundarath | H04L 27/2624 |
| | | | 375/297 |
| 2016/0028574 A1* | 1/2016 | Wang | H04L 27/367 |
| | | | 375/296 |

FOREIGN PATENT DOCUMENTS

| | | |
|---|---|---|
| CN | 103491045 A | 1/2014 |
| WO | 2014085976 A1 | 6/2014 |
| WO | 2014146235 A1 | 9/2014 |
| WO | 2015077083 A1 | 5/2015 |

\* cited by examiner

METHOD AND APPARATUS FOR CREST FACTOR REDUCTION

CROSS REFERENCE TO RELATED APPLICATION(S)

This application is a 35 U.S.C. § 371 National Stage of International Patent Application No. PCT/CN2017/072620, filed Jan. 25, 2017, designating the United States, the disclosure of which is incorporated by reference.

TECHNICAL FIELD

Embodiments of the present disclosure generally relate to the field of communications, and more particularly, to a method and apparatus for crest factor reduction in a wireless communication system.

BACKGROUND

With the increase of wireless communication capacity, more and more advanced digital modulation schemes, e.g. Wideband Code Division Multiple Access (WCDMA), Long Term Evolution (LTE) and 5th-Generation (5G), Institute of Electrical and Electronics Engineers (IEEE) 802.11ac etc. are and will be involved which results in a high crest factor (CF) or a high peak to average power ratio (PAPR) of signal.

Radio frequency (RF) power amplifier (PA) is used in wireless communication networks for the transmission of signals. A peak to average power ratio can be computed from the CF. But high PAPR signal imposes significant operating restrictions on the RF power amplifier, causing lower average output power and efficiency.

To increase efficiency, crest factor reduction (CFR) can be used to decrease the PAPR of a transmitted signal prior to it entering the power amplifier. By doing so, the power amplifier can operate with less back off, and thus increased average efficiency.

Nowadays, numerous CFR methods have been developed. Peak-cancellation CFR (PC-CFR) is one of the CFR methods which have been widely used. The system level performance of the PC-CFR method is shown to be better than other methods such as Peak Windowing and Noise Shaping. In addition, the PC-CFR can be implemented more efficiently than the other methods, resulting in reduced overall cost.

This section introduces aspects that may facilitate a better understanding of the disclosure. Accordingly, the statements of this section are to be read in this light and are not to be understood as admissions about what is in the prior art or what is not in the prior art.

SUMMARY

However, the inventor found that the traditional PC-CFR methods prioritize to optimize an adjacent channel power ratio (ACPR) or out-of-band spectrum emission performance, using limited clipping ratio to avoid an error vector magnitude (EVM) degradation. Therefore, the CFR clipping ratio of the traditional PC-CFR method is quite limited. And synchronization delay and bandwidth alignment of cancellation pulse for subtract operation should be extremely precise, or distortions in in-band waveform would happen which can degrade composite EVM. So the timing and bandwidth precision is quite critical.

Furthermore, noise shaping pulse of the traditional PC-CFR method uses limited order of filter, so the filter is not steep enough to guarantee than the peak is cancelled to sufficient low level for a wideband signal. The peaks at band edge would not be effectively clipped because the noise shaping pulse bandwidth is within the target signal band.

And, the peak detection in the traditional PC-CFR method only detect peak alone and clip it alone which is nonlinear because the signal components in vicinity are not proportionally scaled. This would degrade the composite EVM performance.

In order to solve at least part of the above problems, methods, apparatus, devices and computer programs are provided in the present disclosure. It can be appreciated that embodiments of the present disclosure are not limited to a single carrier wireless communication system, but could be also applied to multi-carrier wireless communication system. And the communication system may use at least one of the following technologies: code division multiple access (CDMA) technology, wideband code division multiple access (WCDMA) technology, time division-synchronous code division multiple access (TD-SCDMA) technology, and worldwide interoperability for microwave access (Wimax) technology. Further, the teachings of the present invention are also applicable to hybrid systems that employ different carriers having different modulation bandwidths.

Various embodiments of the present disclosure mainly aim at providing methods, devices and computer programs for data transmission in a transmitter, for example, in a shared frequency band. Each of the transmitters could be, for example, a terminal device or a network device. Other features and advantages of embodiments of the present disclosure will also be understood from the following description of specific embodiments when read in conjunction with the accompanying drawings, which illustrate, by way of example, the principles of embodiments of the present disclosure.

In general, embodiments of the present disclosure provide a solution for crest factor reduction to solve the problem mentioned above.

In a first aspect, a method in a wireless communication system is provided. The method includes: multiple signal peaks of a target signal exceeding a predetermined threshold magnitude set are detected to constitute one or more peak clusters; one or more noise shaping pulse clusters are generated; the one or more noise shaping pulse clusters are assigned to the detected signal peaks in one or more peak clusters to clip the detected signal peaks in frequency domain; an output signal is calculated based on the clipped signal peaks; the noise shaping pulse cluster includes multiple sub-noise shaping pulses, bandwidths of the multiple sub-noise-shaping pulses are overlapped and a bandwidth of the noise shaping pulse cluster is greater than the bandwidth of the target signal.

In one embodiment, the peaks in one peak cluster are detected according to weight distribution of peak amplitudes; and one or more noise shaping pulse clusters are assigned to the detected signal peaks in one or more peak clusters according to the weight distribution of the peak amplitudes.

In one embodiment, a peak cluster includes a peak with maximum peak amplitude and other peaks which are in vicinity of the peak with maximum peak amplitude.

In one embodiment, the method further including: a pre-channel filtering is performed to pre-suppress band edges on the target signal before assigning one or more noise shaping pulse clusters to the detected signal peaks.

In one embodiment, the method further including: a post-channel filtering is performed to post-suppress band edges on the output signal after assigning one or more noise shaping pulse clusters to the detected signal peaks.

In one embodiment, if the wireless communication system supports multicarrier, the method further including: a multicarrier is split into multiple sub-carriers; a separated pre-channel filtering and/or post-channel filtering is assigned to each of the sub-carriers; the sub-carriers are shifted to corresponding offsets of frequency; multiple filtered sub-carriers are combined into a filtered multicarrier.

In one embodiment, the method further including: the output signal is compared with the target signal to determine whether in-band and/or out-of-band quality meets a predetermined requirement in current iteration; filter coefficients of the noise shaping pulse cluster are adjusted in next iteration when the requirement is not met.

In one embodiment, the method further including: one or more windowing function is generated; a windowing function is multiplied with a signal filtered by the noise shaping pulse cluster.

In one embodiment, filter coefficients of sub-noise shaping pulses in the noise shaping pulse cluster are individually adjusted.

In one embodiment, the block of calculating an output signal based on the clipped signal peaks includes: a delay is performed on the target signal; one or more clipped signals filtered by one or more noise shaping pulse clusters are summed; a summation of the clipped signals is subtracted from the delayed target signal, so as to obtain the output signal.

In one embodiment, the bandwidth of a sub-noise-shaping pulse in one noise shaping pulse cluster is not overlapped with that of other noise shaping pulse cluster.

In one embodiment, the bandwidth of one sub-noise shaping pulse in one noise shaping pulse cluster is identical or different with other sub-noise shaping pulse in the same one noise shaping pulse cluster.

In one embodiment, configuration of the number of sub-noise shaping pulses in each noise shaping pulse cluster is symmetrical or asymmetrical.

In a second aspect, an apparatus in a wireless communication system is provided. The apparatus includes: a peak cluster detector, configured to detect multiple peaks of a target signal exceeding a predetermined threshold magnitude set to constitute one or more peak clusters; multiple noise shaping pulse generators, configured to generate one or more noise shaping pulse clusters; an allocator connected to the peak detector, configured to assign the one or more noise shaping pulse clusters in one or more peak clusters to clip the detected signal peaks in frequency domain; a calculator, configured to calculate an output signal based on the clipped signal peaks; the noise shaping pulse cluster includes multiple sub-noise shaping pulses, bandwidths of the multiple sub-noise-shaping pulses are overlapped and a bandwidth of the noise shaping pulse cluster is greater than the bandwidth of the target signal.

In one embodiment, the peak cluster detector configured to detect the peaks in one peak cluster according to weight distribution of peak amplitudes; and the allocator further configured to assign one or more noise shaping pulse clusters to the detected signal peaks in one or more peak clusters according to the weight distribution of the peak amplitudes.

In one embodiment, a peak cluster includes a peak with maximum peak amplitude and other peaks which are in vicinity of the peak with maximum peak amplitude.

In one embodiment, the apparatus further including: a pre-channel filter connected to the peak detector, configured to perform pre-channel filtering on the target signal to pre-suppress band edges.

In one embodiment, the apparatus further including: a post-channel filter connected to the calculator, configured to perform post-channel filtering on the output signal to post-suppress band edges.

In one embodiment, if the communication system supports multicarrier, the apparatus further including: a carrier splitter connected to the pre-channel filter, configured to split a multicarrier into multiple sub-carriers before performing pre-channel filtering on the target signal; a carrier shifter connected to the post-channel filter, configured to shift the sub-carriers to corresponding offsets of frequency after performing post-channel filtering on the output signal; a carrier combiner connected to the carrier shifter, configured to combine multiple sub-carriers into a multicarrier.

In one embodiment, the bandwidth of a sub-noise-shaping pulse in one noise shaping pulse cluster is not overlapped with that of other noise shaping pulse cluster.

In one embodiment, the apparatus further including: a limiter connected to the calculator, configured to compare the output signal with the target signal to determine whether in-band and/or out-of-band quality meets a predetermined requirement in current iteration; a scaling adjuster connected to the peak detector, configured to adjust filter coefficients of the noise shaping pulse cluster in next iteration when the requirement is not met.

In one embodiment, the apparatus further including: one or more windowing function generators, configured to generate one or more windowing function; one or more multipliers, each configured to multiply a windowing function with a signal filtered by the noise shaping pulse cluster.

In one embodiment, the calculator further including: a delayer, configured to delay the target signal; a summator, configured to calculate summation of one or more clipped signals filtered by one or more noise shaping pulse clusters; a subtractor, configured to subtracting the summation from the delayed target signal, so as to obtain the output signal.

In one embodiment, the bandwidth of one sub-noise shaping pulse in one noise shaping pulse cluster is identical or different with other sub-noise shaping pulse in the same one noise shaping pulse cluster.

In one embodiment, one or more filter coefficients of sub-noise shaping pulses in the noise shaping pulse cluster are individually adjusted.

In one embodiment, configuration of the number of sub-noise shaping pulses in each noise shaping pulse cluster is symmetrical or asymmetrical.

In a third aspect, a device is provided. The device includes: an apparatus as mentioned in the second aspect of the present disclosure.

In a fourth aspect, a computer program is provided. The computer program product is tangibly stored on a computer readable storage medium and including instructions which, when executed by an apparatus or a device, cause the apparatus or device to perform a method according to the first aspect.

In a fifth aspect, a storage medium in which a computer program is stored is provided, wherein the computer program enables a computer to carry out a method according to the first aspect in an apparatus or a device.

In a sixth aspect, an apparatus in a wireless communication system is provided. The apparatus includes: at least one processor and at least one memory including computer program code, the at least one memory and the computer program code configured to, with the at least one processor, cause the apparatus at least to: detect multiple signal peaks of a target signal exceeding a predetermined threshold magnitude set to constitute one or more peak clusters; generate one or more noise shaping pulse clusters; assign the one or more noise shaping pulse clusters to the detected signal peaks in one or more peak clusters to clip the detected signal peaks in frequency domain; calculate an output signal based on the clipped signal peaks; wherein, the noise shaping pulse cluster includes multiple sub-noise shaping pulses, bandwidths of the multiple sub-noise-shaping pulses are overlapped and a bandwidth of the noise shaping pulse cluster is greater than the bandwidth of the target signal.

According to various embodiments of the present disclosure, it can make equalization on LTE/Orthogonal Frequency Division Multiple Access (OFDMA) frequency domain along with allocated resource blocks to achieve better peak error vector magnitude, improve the system throughput and clip PAPR into lower value than the prior arts for advanced modulation scheme. It can also benefit RF PA to output higher power with lower cost due to lower peak power requirements and higher efficiency.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
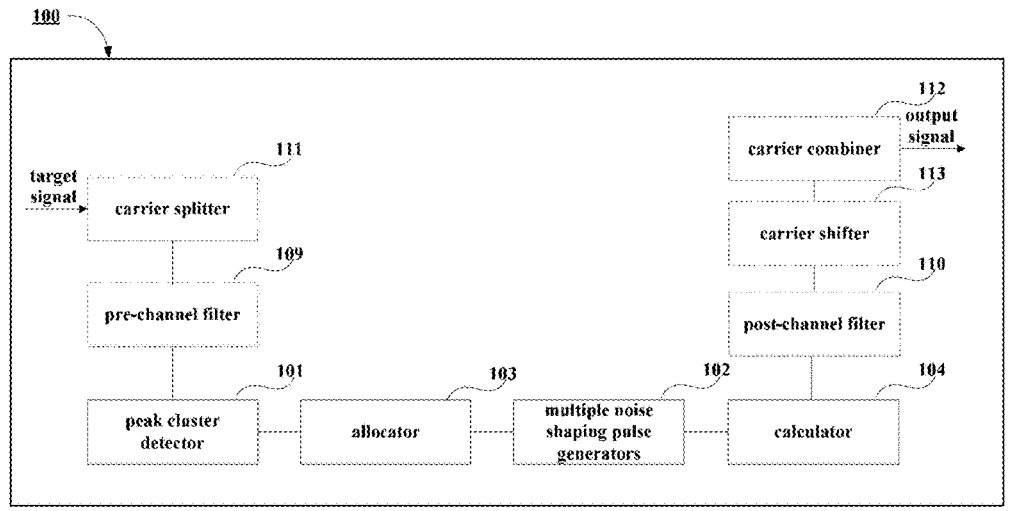
FIG. 1 shows a block diagram of an apparatus 100 in a wireless communication system in accordance with an embodiment of the present disclosure.

The present disclosure will now be described with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth.

Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like. The network device or the terminal device may include an apparatus mentioned below.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Before describing the examples illustratively depicted in the several figures, a general introduction is provided for further understanding.

Wireless or cellular base stations may employ multi-carrier air interface technologies to make efficient use of available Radio Frequency (RF) spectrum. Conventionally, a digital up-converter (DUC) may be used to translate different baseband channels at predetermined offsets in a frequency domain for adding them together to produce multi-carrier signal. Thus, such a multi-carrier or multiuser signal being readied for transmission may have a high PAPR. To reduce or back-off a dynamic range of such multi-carrier or multiuser signal prior to inputting to a power amplifier, PAPR may be reduced to increase PA efficiency by allowing higher average power to be transmitted before saturation occurs.

Conventionally, crest factor reduction (CFR) in a transmitter is used to limit the PAPR of a signal. PC-CFR detects peaks above a predetermined threshold with respect to a signal envelope and then cancels those peaks above such threshold using a suitable cancellation pulse (CP).

The inventor founds that the main reason why the PAPR can't be clipped into an ideal value is that: if further clipping is used, the EVM would degrade so much to cause serious bit error rate (BER) value. In a wireless communication system, the Media Access Control (MAC) layer has a Hybrid Automatic Repeat request (HARQ) scheme to resend the symbols with high BER, then the throughput may be deteriorated.

The present disclosure addresses throughput performance which prioritizes the EVM performance first. During the clipping process, the composite EVM and peaking EVM are equalized to guarantee that even more clipping is applied. By doing so, it is observed that the EVM could be much smaller with the same clipping ratio level which indicates that more clipping could be possible.

With the above general understanding borne in mind, various configurations for PC-CFR are generally described below.

A First Aspect of Embodiments

An apparatus in a wireless communication system is provided in those embodiments. The apparatus may be configured in a network device or a terminal device.

FIG. 1 shows a block diagram of an apparatus 100 in a wireless communication system in accordance with an embodiment of the present disclosure. As shown in FIG. 1, the apparatus includes:

a peak cluster detector 101 configured to detect multiple peaks of a target signal exceeding a predetermined threshold magnitude set to constitute one or more peak clusters;

multiple noise shaping pulse generators 102 configured to generate one or more noise shaping pulse clusters;

an allocator 103 connected to the peak detector configured to assign the one or more noise shaping pulse clusters in one or more peak clusters to clip the detected signal peaks in frequency domain; and a calculator 104 configured to calculate an output signal based on the clipped signal peaks.

In one embodiment, the noise shaping pulse cluster includes multiple sub-noise shaping pulses, bandwidths of the multiple sub-noise-shaping pulses are overlapped and a bandwidth of the noise shaping pulse cluster is greater than the bandwidth of the target signal.

In one embodiment, the target signal is converted from a digital base band signal by a digital up converter. Thus, the target signal may exhibit a high PAPR characteristic. After being processed by the apparatus 100, peaks in the target signal are detected and cancelled to produce an output signal with reduced PAPR by clipping the peaks in the target signal.

In one embodiment, in order to avoid degrading the EVM performance, the peak cluster detector 101 detects multiple peaks of a target signal exceeding a predetermined threshold magnitude set to constitute one or more peak clusters.

In one embodiment, the peak cluster detector 101 detects the peaks in one peak cluster according to weight distribution of peak amplitudes. Each peak cluster includes a peak with maximum peak amplitude and other peaks which are in vicinity of the peak with maximum peak amplitude. So the peak cluster detector 101 works on the target signal magnitudes to produce a peak with maximum peak amplitude and vicinity location indicator along with magnitude and phase information for each peak in each peak cluster.

In one embodiment, the predetermined threshold used to detect the peaks is not a constant single value, but a set of weight distributed threshold mask to guarantee the proper clipping ratio in one peak cluster including a peak with maximum peak amplitude and peaks in vicinity of the peak with maximum peak amplitude. Each threshold value in the threshold magnitude set is correlated to the clipping ratio of each peak in the peak cluster. The higher the clipping ratio of the peak is, the larger the threshold value of the peak is. The threshold magnitude set includes at least one threshold value with at least one clipping ratio for one peak cluster.

In one embodiment, the threshold magnitude set may be higher than the desired clipping threshold set accordingly. But it is not limited thereto, the threshold magnitude set may be predetermined on demand or adaptively.

In one embodiment, the scope of the vicinity, namely, the number of peaks in one peak cluster may be determined on demand. For example, it may be determined based on the number of the sub-noise shaping pulses in one noise shaping pulse cluster. Or other peaks except for the peak with maximum peak amplitude in one peak cluster are in a predetermined time region of the peak with maximum peak amplitude in one peak cluster.

Figure 2:
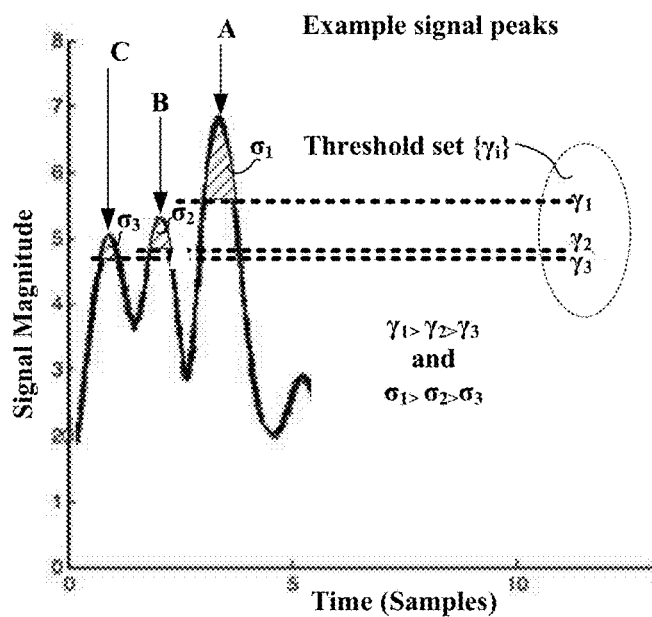
FIG. 2 shows an example of detected peaks in one peak cluster.

FIG. 2 shows an illustration of detected peaks in one peak cluster. As shown in FIG. 2, $\gamma_i$ is the individual clipping threshold value of the threshold magnitude set, where i denotes the index of threshold magnitude set. $\gamma_i$ is correlated to the clipping ratio $\sigma_i$, where $\gamma_1$ denotes the threshold value for the peak with maximum peak amplitude in the cluster with maximum $\sigma_1$; as for $\gamma_2$ (the $2^{nd}$ largest), $\gamma_3$ (the $3^{rd}$ largest) etc. are used for the peaks in vicinity in descending magnitude order with gradually reduced clipping ratio $\sigma_2$, $\sigma_3$ etc. A peak cluster includes a peak A with maximum peak amplitude and other peaks B and C which are in vicinity of the peak A. Peak A exceeds a threshold magnitude $65_1$, peak B exceeds a threshold magnitude $\gamma_2$, peak C exceeds a threshold magnitude $\gamma_3$. The peak cluster detector 101 produces both a peak A and vicinity peaks B and C along with magnitude and phase information for each peak.

With the above embodiments, peak cluster can be detected rather than a single peak which can avoid the degradation of the EVM performance and alleviate of non-linear clipping effects.

In one embodiment, output of the peak cluster detector 101 may be provided as an input to the multiple noise shaping pulse generators 102. Multiple noise shaping pulse generators 102 may be configured for applying multiple sub-noise shaping pulses to the target signal to clip the detected peaks.

In one embodiment, multiple noise shaping pulse generators 102 are configured to generate one or more noise shaping pulse clusters; the noise shaping pulse cluster includes multiple sub-noise shaping pulses, bandwidths of the multiple sub-noise-shaping pulses are overlapped to cover the target signal bandwidth and a bandwidth of the noise shaping pulse cluster is greater than the bandwidth of the target signal to cover broader bandwidth.

In one embodiment, the bandwidth of one sub-noise shaping pulse in one noise shaping pulse cluster is identical or different with other sub-noise shaping pulse in the same one noise shaping pulse cluster. However, the sub-noise shaping pulses in different cluster are not overlapped.

In one embodiment, a bandwidth of the noise shaping pulse cluster may be slightly greater than the bandwidth of the target signal, but it is not limited thereto.

In one embodiment, configuration of the number of sub-noise shaping pulses in each noise shaping pulse cluster is symmetrical or asymmetrical. The number of sub-noise shaping pulses in each noise shaping pulse cluster can be well controlled to trade off performance and hardware resource. The more noise shaping pulse generators, the better clipping it would be performed. But it is not limited thereto, the number of sub-noise shaping pulses in each noise shaping pulse cluster can be determined to match the number of clocks per sample is done for hardware efficiency.

With the embodiments, multiple sub-noise shaping pulses being overlapped to clip singe peak and its vicinity area in the same peak cluster form linearly. So the overall cluster bandwidth may be slightly larger than the target signal bandwidth so that no band edge clipping leakage would happen. Since the out of band power is dramatically lower than the main signal, so the over clipping there would not contribute obvious impact on performance.

In one embodiment, each noise shaping pulse generator 102 outputs an unscaled version of the cancellation pulse waveform aligned with the detected peak.

Figure 3:
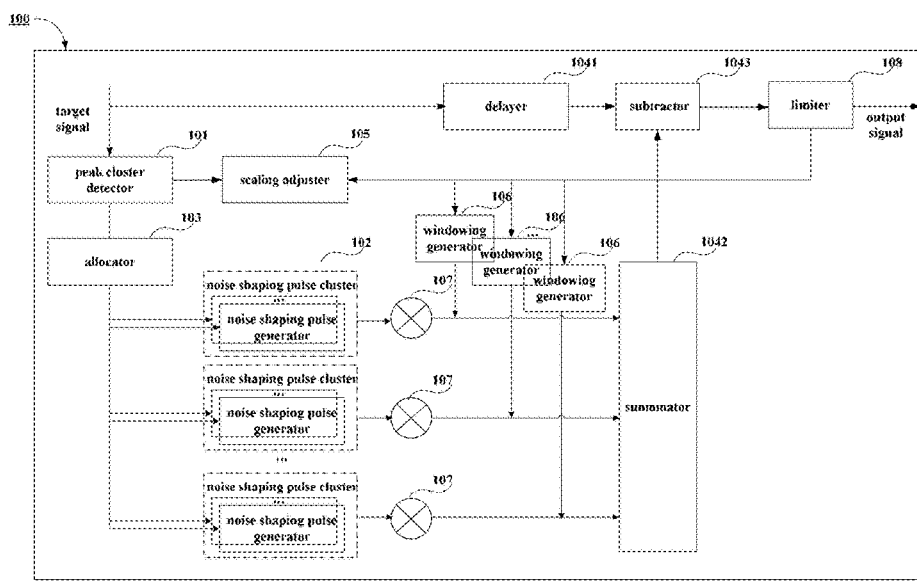
FIG. 3 shows a block diagram of an apparatus 100 in a wireless communication system in accordance with an embodiment of the present disclosure.

FIG. 3 shows a block diagram of the apparatus 100 in a wireless communication system in accordance with an embodiment of the present disclosure. As shown in FIG. 3, the apparatus further includes: a scaling adjuster 105 connected to the peak cluster detector 101, the difference between the cluster magnitudes and the clipping threshold set is generated by the scaling adjuster 105. The magnitude difference is combined with the phase information to produce the complex weighting that is used to scale the sub-noise shaping pulse coefficients.

The scaling value generated by the scaling adjuster 105 can be illustrated as equation 1 as the following.

$$\alpha = (|x| - \gamma_i) \times e^{j\theta} \quad \text{(Equation 1)}$$

In equation 1, $\alpha$ is the scaling value, $|x|$ is the magnitude of the peaks in the peak cluster, $\gamma_i$ is the individual clipping threshold value of the threshold magnitude set, where i denotes the index of threshold magnitude set and $\theta$ is the phase of the peaks in the peak cluster. The magnitude and phase information is produced by the peak cluster detector 101. $\gamma_i$ is correlated to the clipping ratio set $\sigma_i$, the detail method to determine $\gamma_i$ has been described in the above and is omitted herein for simplicity of description.

In this embodiment, the apparatus 100 further includes: one or more windowing function generators 106 and one or more multipliers 107, one or more windowing function generators 106 which are configured to generate one or more windowing function; each multiplier 107 is configured to multiply a windowing function with a clipped signal filtered by the noise shaping pulse cluster.

In this embodiment, the numbers of the windowing function generators 106 and multipliers 107 are equal to that of the noise shaping pulse clusters. Each windowing function generator 106 and multiplier 107 corresponds to one noise shaping pulse cluster.

In this embodiment, filter coefficients of sub-noise shaping pulses in one noise shaping pulse cluster are individually adjusted by windowing function to preserve the spectrum emission mask (SEM). The base band signal to remove both the unwanted peak and its vicinity alone LTE allocated RB, which is quite different from prior art. By doing so, it may prevent the band edge leakage from impacting on the EVM, then achieve a smaller EVM value with the same clipping ratio. The windowing function is used to smooth the sub-noise shaping pulse which can help to mitigate EVM degradations.

In this embodiment, the allocator 103 is connected to the peak detector 101 and configured to control the distribution of the one or more noise shaping pulse clusters to the incoming peak clusters so as to clip the detected signal peaks in frequency domain.

In one embodiment, the allocator 103 is configured to assign one noise shaping pulse cluster to one peak cluster and assign at least one sub-noise shaping pulse to one peak in the detected peak cluster in the time domain according to the weight distribution of the peak amplitudes. For example, a clipping ratio to each peak in the peak cluster is determined according to the weight distribution of the peak amplitudes, that is, there is a positive correlation between the clipping ratio of the peaks in one peak cluster and the peak amplitudes. The larger the clipping ratio of the peak with higher peak amplitude is, the smaller the clipping ratio of the peak with lower peak amplitude is.

In this embodiment, during startup, all noise shaping pulse clusters are available. When the peak detector 101 produces a new peak cluster indicator, the allocator 103 assigns one available noise shaping pulse cluster to the cancelation of that peak cluster. Once allocated, the noise shaping pulse cluster becomes unavailable for the length of the noise shaping pulse. When the subsequent peak cluster arrives, the allocator 103 checks through the status of each noise shaping pulse cluster. If all noise shaping pulse cluster are unavailable, the peaks in the subsequent peak cluster will not be cancelled. So multiple iterations are necessary to eliminate the peaks that were not cancelled during an earlier pass. The subsequent peak cluster may be picked up by a subsequent iteration. The details of the iteration will be described below.

In this embodiment, the apparatus further includes: a limiter 108 which is connected to the calculator 104 and configured to compare the output signal with the target signal to determine whether in-band and/or out-of-band quality meets a predetermined requirement in current iteration; when the requirement is not met, the scaling adjuster 105 is configured to adjust filter coefficients of the noise shaping pulse cluster in next iteration.

In one embodiment, the in-band quality may be represented by EVM, the out-of-band quality may be represented by ACPR, the out-of-band ACPR can be checked after EVM priority. If the output signal meets the EVM requirement, the signal can be outputted, otherwise, the scaling adjuster 105 adjusts the filter coefficients in next iteration by multiplying windowing function to restore the EVM performance. Also, if the ACPR value is under a threshold, the signal can be outputted, otherwise, the scaling adjuster 105 adjusts the filter coefficients in next iteration by multiplying windowing function to restore the ACPR performance. Therefore, both in-band and out-of-band detection for comparison after each iteration would be realized till all of them meet a predetermined requirement, such as, EVM requirement or ACPR requirement.

EVM is an example for the in-band quality and ACPR is an example for out-of-band quality. Furthermore, only in-band quality or out-of-band quality or both of them may be used as a termination of each iteration. But it is not limited thereto.

In this embodiment, the calculator 104 further includes: a delayer 1041 which is configured to delay the target signal; a summator 1042 which is configured to calculate summation of one or more clipped signals filtered by one or more noise shaping pulse clusters; and a subtractor 1043 which is configured to subtract the summation from the delayed target signal, so as to obtain the output signal.

As shown in FIG. 1, in this embodiment, the apparatus further includes: a pre-channel filter 109 which is connected to the peak detector 101 and configured to perform pre-channel filtering on the target signal to pre-suppress band edges. The pre-channel filter 109 is used to suppress the digital front end side bands to the maximum level, so sufficient buffering for the peak over clipping will be provided by channel filtering before clipping.

In this embodiment, the apparatus further includes: a post-channel filter 110 which is connected to the calculator and configured to perform post-channel filtering on the output signal to post-suppress band edges. The post-channel filter 110 is used to suppress the spectrum growth after clipping to mitigate the impact.

With this embodiment, the pre-channel filtering and the post-channel filtering may be used to enhance the suppression of ACPR degradation to an acceptable level.

As shown in FIG. 1, in this embodiment, if the wireless communication system supports multicarrier, the apparatus 100 further includes: a carrier splitter 111 which is connected to the pre-channel filter 109 and configured to split a multicarrier into multiple sub-carriers before performing pre-channel filtering on the target signal; a carrier combiner 112 which is configured to combine multiple sub-carriers into a multicarrier after performing post-channel filtering on the output signal.

In this embodiment, the apparatus 100 further includes: a carrier shifter 113 which is connected to the post-channel filter 110 and configured to shift the sub-carriers to corresponding offsets of frequency before combining for reconstruction.

In one embodiment, the apparatus 100 further includes: a transmitting module (not shown in the drawings) which is configured to transmit the output signal after peak cancellation to a receiver in the wireless communication system. The receiver in the wireless communication system receives that output signal after peak cancellation. As can be seen from the above embodiments, it can make equalization on LTE/Orthogonal Frequency Division Multiple Access (OFDMA) frequency domain along with allocated resource blocks to achieve better peak error vector magnitude, improve the system throughput and clip PAPR into lower value than prior arts for advanced modulation scheme. It can also benefit RF PA to output higher power with lower cost due to lower peak power requirements and higher efficiency.

It is to be understood that, the above examples or embodiments are discussed for illustration, rather than limitation.

Those skilled in the art would appreciate that there may be many other embodiments or examples within the scope of the present disclosure.

A Second Aspect of Embodiments

A method in a wireless communication system is provided in these embodiments. The method is implemented by an apparatus provided in the first aspect of embodiments, and the same contents as those in the first aspect of embodiments are omitted.

Figure 4:
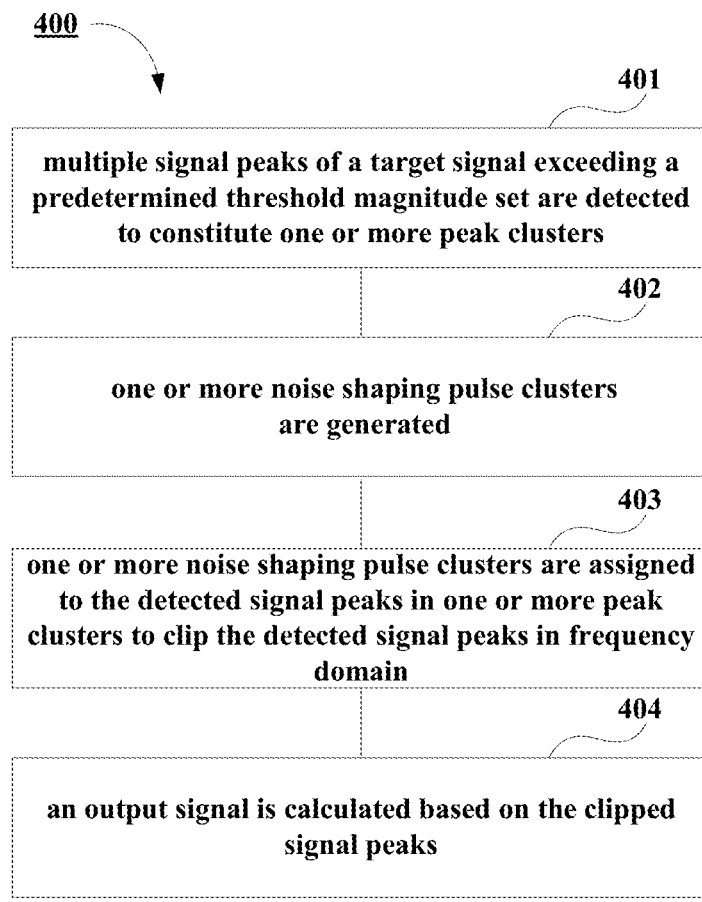
FIG. 4 shows a diagram of crest factor reduction method 400 in accordance with an embodiment of the present disclosure

FIG. 4 shows a diagram of crest factor reduction method 400 in accordance with an embodiment of the present disclosure, and illustrates the method of crest factor reduction from a viewpoint of the apparatus 100. As shown in FIG. 4, the method includes:

Block 401, multiple signal peaks of a target signal exceeding a predetermined threshold magnitude set are detected to constitute one or more peak clusters;

Block 402, multiple sub-noise shaping pulses are generated to constitute one or more noise shaping pulse clusters;

Block 403, the one or more noise shaping pulse clusters are assigned to the detected signal peaks in one or more peak clusters to clip the detected signal peaks in frequency domain;

Block 404, an output signal is calculated based on the clipped signal peaks.

In this embodiment, the noise shaping pulse cluster includes multiple sub-noise shaping pulses, bandwidths of the multiple sub-noise-shaping pulses are overlapped and a bandwidth of the noise shaping pulse cluster is greater than the bandwidth of the target signal.

In this embodiment, the peaks in one peak cluster are detected by weight distribution of peak amplitudes; one or more noise shaping pulse clusters are assigned to the detected signal peaks in one or more peak clusters according to the weight distribution of the peak amplitudes.

In this embodiment, a peak cluster includes a peak with maximum peak amplitude and other peaks which are in vicinity of the peak with maximum peak amplitude.

In this embodiment, the bandwidth of a sub-noise-shaping pulse in one noise shaping pulse cluster is not overlapped with that of other noise shaping pulse cluster.

In this embodiment, the bandwidth of one sub-noise shaping pulse in one noise shaping pulse cluster is identical or different with other sub-noise shaping pulse in the same one noise shaping pulse cluster.

In this embodiment, configuration of the number of sub-noise shaping pulses in each noise shaping pulse cluster is symmetrical or asymmetrical.

As can be seen from the above embodiments, it can make equalization on LTE/Orthogonal Frequency Division Multiple Access (OFDMA) frequency domain along with allocated resource blocks to achieve better peak error vector magnitude, improve the system throughput and clip PAPR into lower value than prior arts for advanced modulation scheme. It can also benefit RF PA to output higher power with lower cost due to lower peak power requirements and higher efficiency.

Figure 5:
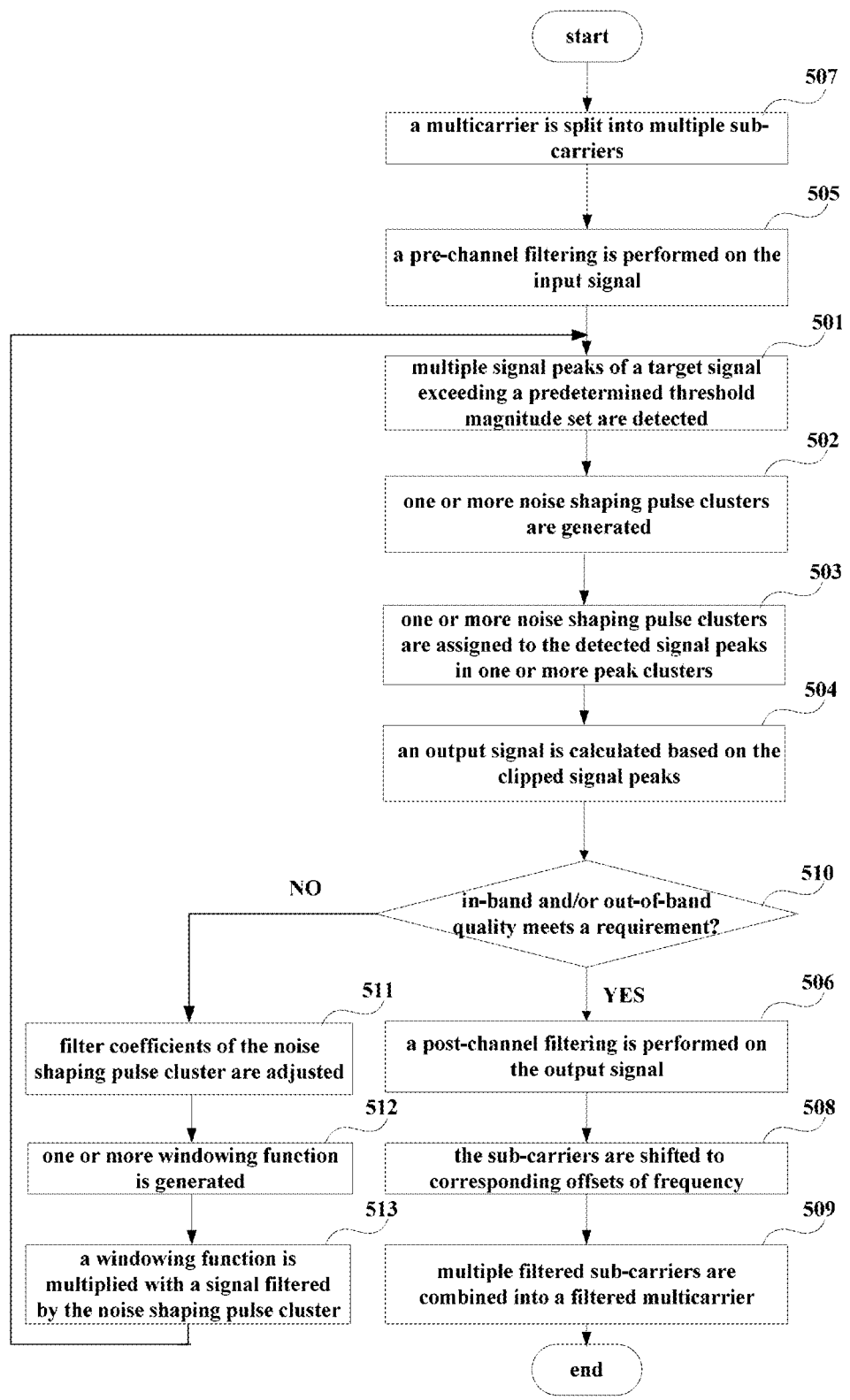
FIG. 5 shows a diagram of crest factor reduction method 500 in accordance with an embodiment of the present disclosure.

FIG. 5 shows a diagram of crest factor reduction method 500 in accordance with an embodiment of the present disclosure, and illustrates the method of crest factor reduction from a viewpoint of the apparatus 100. As shown in FIG. 5, the method includes: blocks 501-504 which are similar to blocks 401-404 which are omitted here.

In this embodiment, in order to enhance the suppression of ACPR degradation, the method 500 further includes:

Block 505, a pre-channel filtering is performed on the target signal to pre-suppress band edges before assigning one or more noise shaping pulse clusters to the detected signal peaks.

In this embodiment, the method 500 further includes:

Block 506, a post-channel filtering is performed on the output signal to post-suppress band edges after assigning one or more noise shaping pulse clusters to the detected signal peaks.

In this embodiment, if the wireless communication system supports multicarrier, the method 500 further includes:

Block 507, a multicarrier is split into multiple sub-carriers before block 505; a separated pre-channel filtering and/or post-channel filtering is assigned to each of the sub-carriers after block 506; Block 508, the sub-carriers are shifted to corresponding offsets of frequency; Block 509, multiple filtered sub-carriers are combined into a filtered multicarrier after block 508.

In one embodiment, the method 500 further includes:

Block 510, the output signal is compared with the target signal to determine whether in-band and/or out-of-band quality meets a predetermined requirement in current iteration;

Block 511, filter coefficients of the noise shaping pulse cluster are adjusted in next iteration when the requirement is not met.

In one embodiment, the method 500 further includes: Block 512, one or more windowing function is generated; Block 513, a windowing function is multiplied with a signal filtered by the noise shaping pulse cluster. After the filter coefficients of the noise shaping pulse cluster are adjusted by multiplying the windowing function, it goes into next iteration, that is, goes back to block 501, the detected peaks are applied to the noise shaping pulse cluster with adjusted filter coefficients to perform peak cancellation.

In this embodiment, filter coefficients of sub-noise shaping pulses in the noise shaping pulse cluster are individually adjusted.

Figure 6:
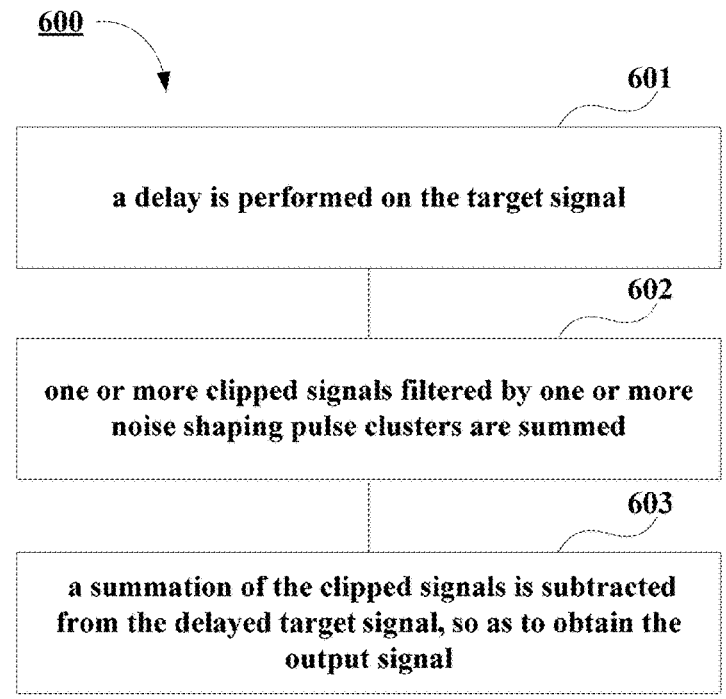
FIG. 6 shows a diagram of block 404 and 504 in accordance with an embodiment of the present disclosure.

FIG. 6 shows a diagram of block 404 and 504 in accordance with an embodiment of the present disclosure. As shown in FIG. 6, the method includes:

Block 601, a delay is performed on the target signal;

Block 602, one or more clipped signals filtered by one or more noise shaping pulse clusters are summed;

Block 603, a summation of the clipped signals is subtracted from the delayed target signal, so as to obtain the output signal.

In one embodiment, the method 400 further includes: the output signal after peak cancellation is transmitted to a receiver in the wireless communication system. The receiver in the wireless communication system receives that output signal after peak cancellation. As can be seen from the above embodiments, it can make equalization on LTE/Orthogonal Frequency Division Multiple Access (OFDMA) frequency domain along with allocated resource blocks to achieve better peak error vector magnitude, improve the system throughput and clip PAPR into lower value than prior arts for advanced modulation scheme. It is also benefit RF PA to output higher power with lower cost due to lower peak power requirements and higher efficiency.

It should be appreciated that components included in the apparatus 100 correspond to the operations of the methods 400 and/or 500. Therefore, all operations and features described above with reference to FIGS. 4 and 5 are likewise applicable to the components included in the apparatus 100 and have similar effects. For the purpose of simplification, the details will be omitted.

Figure 7:
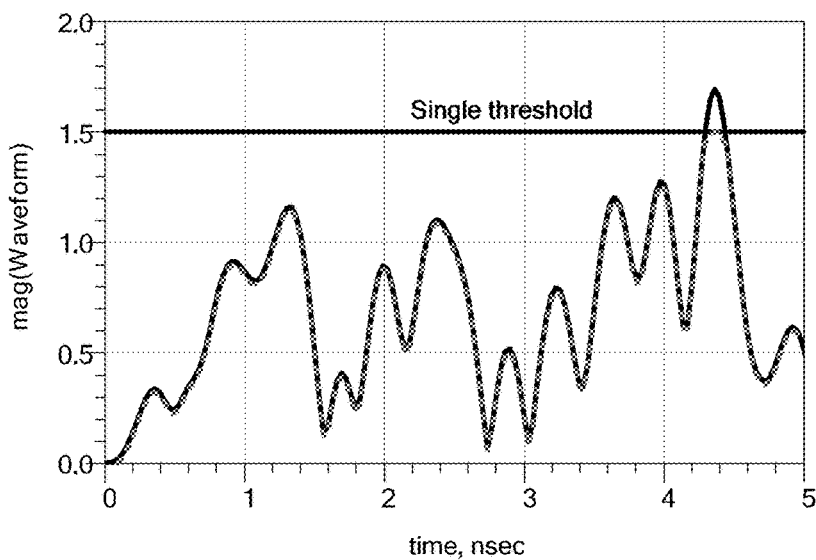
FIG. 7 and FIG. 8 show a time domain clipped signal waveform comparison between the prior arts and the present disclosure.
Figure 8:
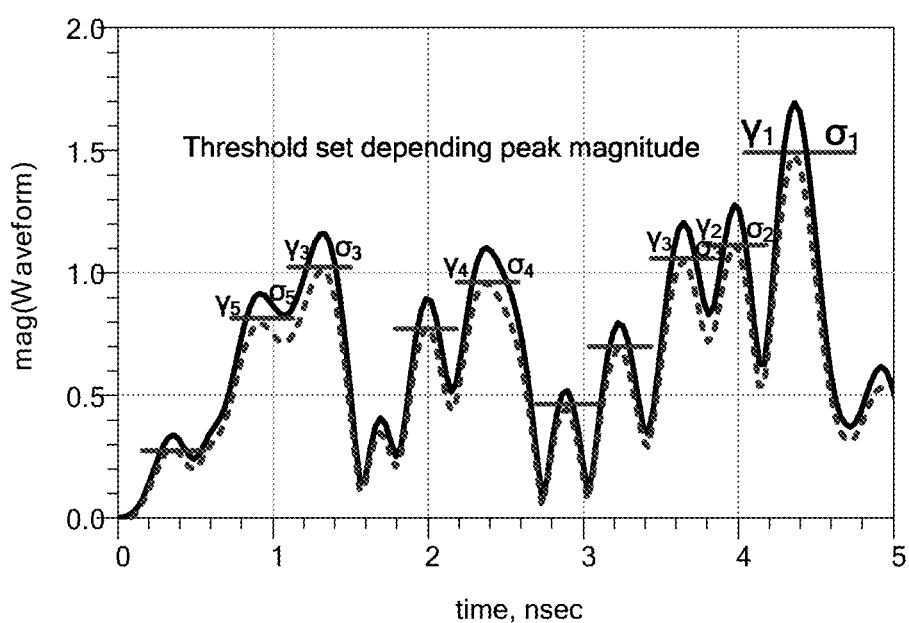

FIG. 7 and FIG. 8 show a time domain clipped signal waveform comparison between the prior arts and the present disclosure. The horizontal line overlaid on the plot in FIGS. 7 and 8 indicates the clipping threshold set. The peaks that exceed this threshold are a candidate for cancellation. As shown in FIG. 7, only one peak is clipped alone at once in the prior arts. As shown in FIG. 8, peak and its vicinity location peaks are in a cluster form for clipping in the present disclosure, so the method of CFR in the present disclosure is more linear clipping method than the prior arts for EVM performance.

Figure 9:
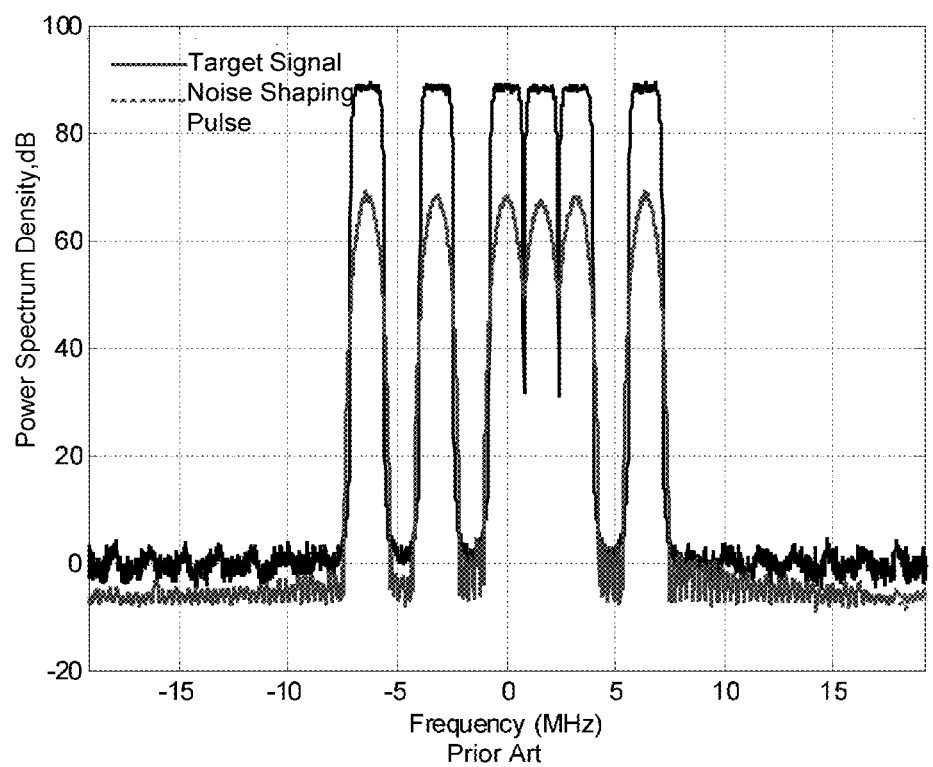
FIG. 9 and FIG. 10 show a multicarrier spectrum comparison between the prior arts and the present disclosure.
Figure 10:
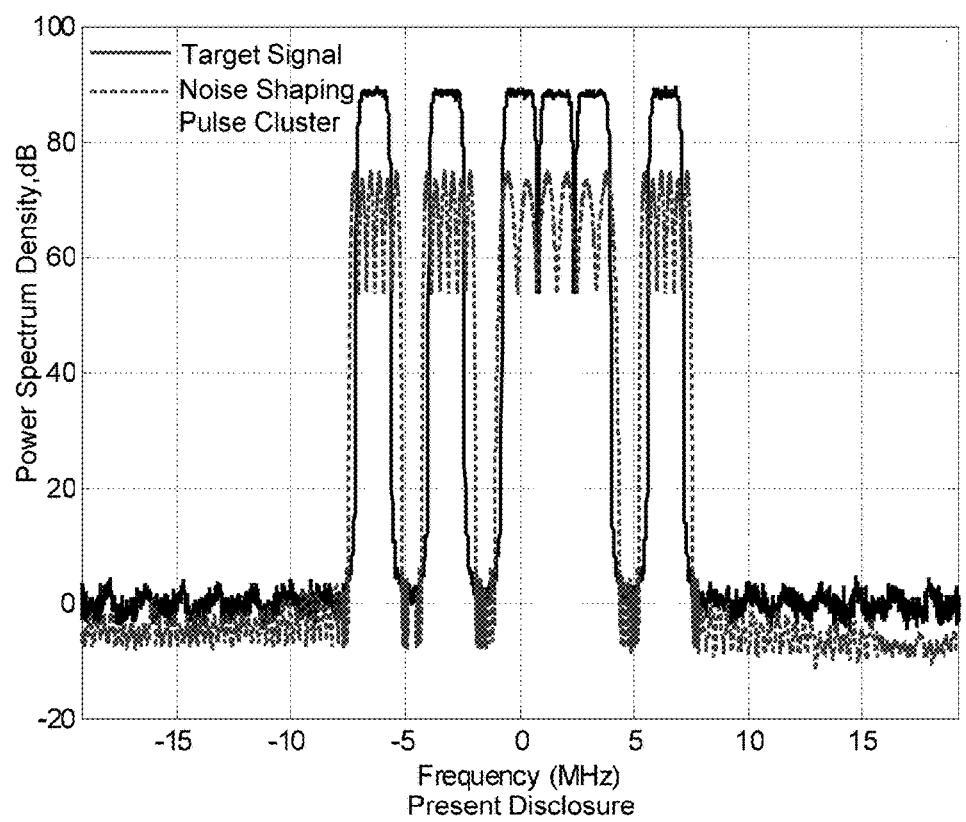

FIG. 9 and FIG. 10 show a multicarrier spectrum comparison between the prior arts and the present disclosure. As shown in FIG. 9 and FIG. 10, the power spectral density (PSD) of the target signal is overlaid with the PSD of the noise shaping pulse cluster signal. In case of single carrier scenario, the noise shaping pulse cluster spectrum is smoother. As shown in FIG. 10, the multiple sub-noise shaping pulses are overlapped and the overall noise shaping pulse cluster bandwidth is larger than the single carrier signal bandwidth for clipping. Since the relationship between noise shaping pulse clusters are independent, it is possible different noise shaping pulse clusters use different sub-noise shaping pulse bandwidths as shown.

Figure 11:
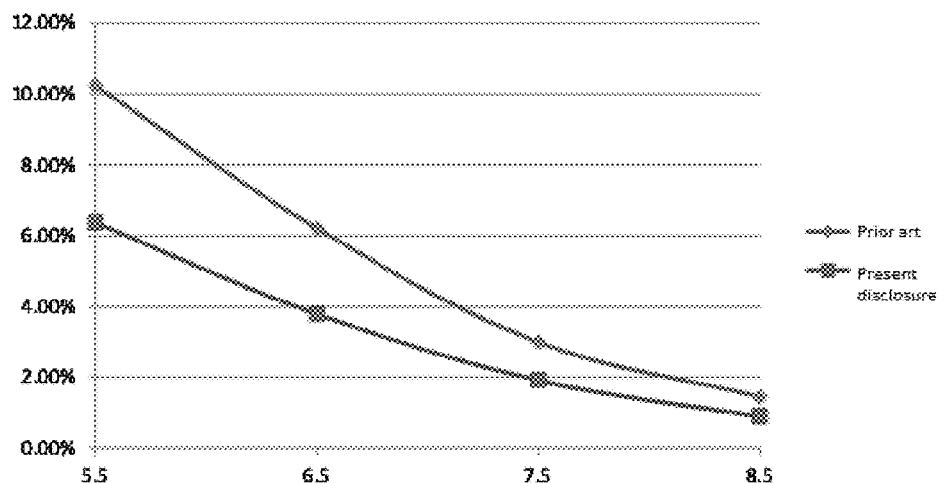
FIG. 11 shows a peak EVM performance comparison with prior art and the present disclosure.
Figure 12:
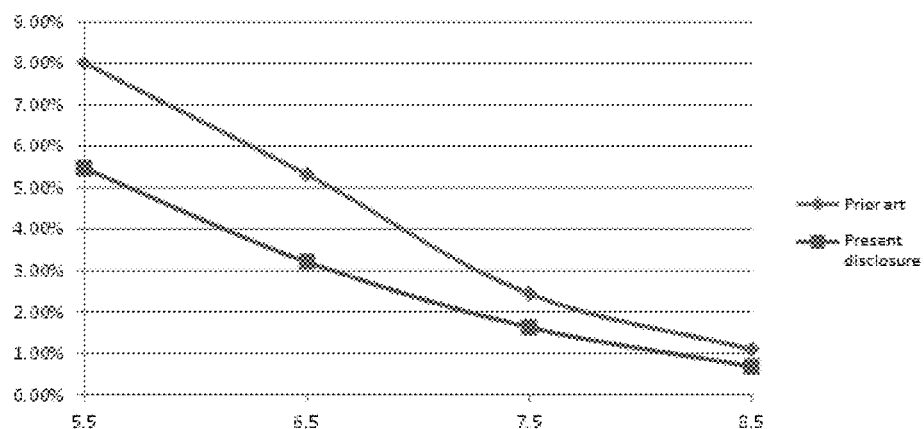
FIG. 12 shows a Root Mean Squared (RMS) EVM performance comparison with prior art and the present disclosure.

FIG. 11 shows a peak EVM performance comparison with the prior arts and the present disclosure. FIG. 12 shows a RMS EVM performance comparison with the prior arts and the present disclosure. As shown in FIG. 11 and FIG. 12, the present disclosure can achieve much better EVM performance than the prior arts, especially with high clipping ratio scenarios. On the other hand, it indicates, with the same EVM requirement, the present disclosure can clip more to for higher RF PA efficiency and linearity performance as well as for digital pre-distortion (DPD) performance.

A Third Aspect of Embodiments

An apparatus in a wireless communication system is provided in these embodiments.

Figure 13:
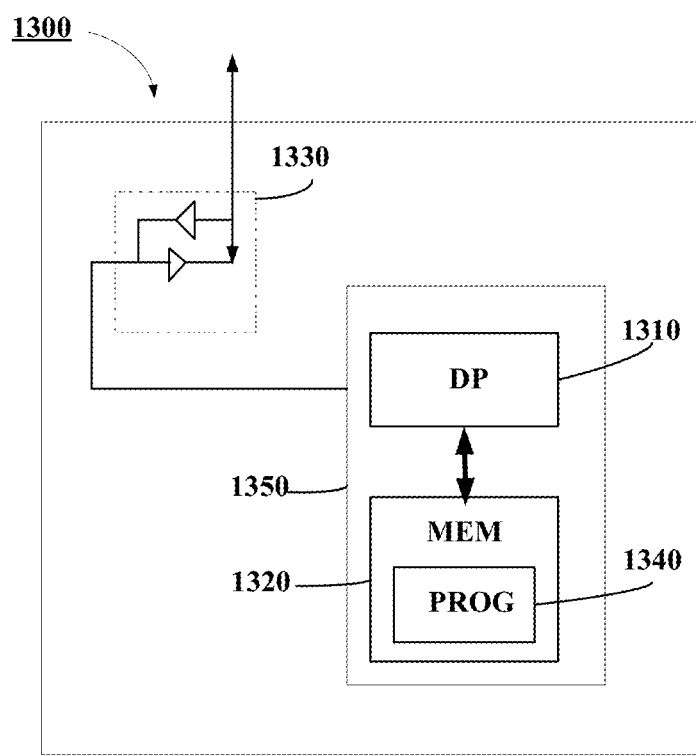
FIG. 13 shows a simplified block diagram of an apparatus 1300 in a wireless communication system in accordance with an embodiment of the present disclosure.

FIG. 13 shows a simplified block diagram of an apparatus 1300 in a wireless communication system in accordance with an embodiment of the present disclosure. It would be appreciated that the apparatus 1300 may be implemented as at least a part of, for example, a network device or a terminal device, especially may be implemented as at least a part of, for example, a transmitter or a transceiver included in a network device or a terminal device.

As shown in FIG. 13, the apparatus 1300 includes: a communicating means 1330 and a processing means 1350. The processing means 1350 includes a data processor (DP) 1310, a memory (MEM) 1320 coupled to the DP 1310. The communicating means 1330 is coupled to the DP 1310 in the processing means 1350. The MEM 1320 stores a program (PROG) 1340. The communicating means 1330 is for communications with other devices, which may be implemented as a transceiver for transmitting/receiving signals.

In some embodiments where the apparatus 1300 acts as a network device, the processing means 1350 may be configured to perform peak cancellation to the target signal and obtain the output signal, and the communicating means 1330 may be configured to transmit the output signal or receive the output signal transmitted by a terminal device. In some other embodiments where the apparatus 1300 acts as a terminal device, the processing means 1350 may be configured to perform peak cancellation to the target signal and obtain the output signal, and the communicating means 1330 may be configured to transmit the output signal or receive the output signal transmitted by the network device.

For example, the memory 1320 stores a plurality of instructions; and the processor 1310 coupled to the memory 1320 and configured to execute the instructions to: detect multiple signal peaks of a target signal exceeding a predetermined threshold magnitude set to constitute one or more peak clusters; generate one or more noise shaping pulse clusters; assign the one or more noise shaping pulse clusters to the detected signal peaks in one or more peak clusters to clip the detected signal peaks in frequency domain; calculate an output signal based on the clipped signal peaks; wherein, the noise shaping pulse cluster includes multiple sub-noise shaping pulses, bandwidths of the multiple sub-noise-shaping pulses are overlapped and a bandwidth of the noise shaping pulse cluster is greater than the bandwidth of the target signal.

The PROG 1340 is assumed to include program instructions that, when executed by the associated DP 1310, enable the apparatus 1300 to operate in accordance with the embodiments of the present disclosure, as discussed herein with the method 400 or 500. The embodiments herein may be implemented by computer software executable by the DP 1310 of the apparatus 1300, or by hardware, or by a combination of software and hardware. A combination of the data processor 1310 and MEM 1320 may form processing means 1350 adapted to implement various embodiments of the present disclosure.

The MEM 1320 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 1300, there may be several physically distinct memory modules in the apparatus 1300. The DP 1310 may be of any type suitable to the local technical environment, and may include one or more of general purpose computers, special purpose computers, microprocessors, digital signal processors (DSPs) and processors based on multicore processor architecture, as non-limiting examples. The apparatus 1300 may have multiple processors, such as an application specific integrated circuit chip that is slaved in time to a clock which synchronizes the main processor.

A device (such as a terminal device or a network device, not shown) is provided in an embodiment, the device includes the apparatus 100 or 1300, and the same contents as those in the first aspect and the second aspect of embodiments are omitted.

An embodiment of the present disclosure provides a computer program product being tangibly stored on a computer readable storage medium and including instructions which, when executed by a device or an apparatus, cause the device or the apparatus to perform a method provided in the second aspect of embodiments.

An embodiment of the present disclosure provides a storage medium in which a computer program is stored, wherein the computer program enables a computer to carry out a method provided in the second aspect of embodiments in an apparatus or a transmitter.

It will be appreciated that embodiments of the invention described herein may be comprised of one or more conventional processors and unique stored program instructions that control the one or more processors to implement, in conjunction with certain non-processor circuits, some, most, or all of the functions of generating a multicarrier communication signal having a reduced crest factor as described herein. The non-processor circuits may include, but are not limited to, a radio transmitter, signal drivers, clock circuits, power source circuits, and user input devices. As such, these functions may be interpreted as blocks of a method for generating a signal having a reduced crest factor. Alternatively, some or all functions could be implemented by a state machine that has no stored program instructions, or in one or more application specific integrated circuits (ASICs), in which each function or some combinations of certain of the functions are implemented as custom logic. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

For example, one or more of the examples described herein may be implemented in a field programmable gate array (FPGA), typically includes an array of programmable tiles. These programmable tiles can include, for example, input/output blocks (IOBs), configurable logic blocks (CLBs), dedicated random access memory blocks (BRAMs), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing.

More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at an apparatus in a wireless communication system, the method comprising:
    detecting multiple signal peaks of a target signal exceeding a predetermined threshold magnitude set to constitute one or more peak clusters;
    generating one or more noise shaping pulse clusters;
    assigning the one or more noise shaping pulse clusters to the detected signal peaks in one or more peak clusters to clip the detected signal peaks in frequency domain;
    calculating an output signal based on the clipped signal peaks;
    wherein, the noise shaping pulse cluster comprises multiple sub-noise shaping pulses, bandwidths of the multiple sub-noise-shaping pulses are overlapped and a bandwidth of the noise shaping pulse cluster is greater than the bandwidth of the target signal.

2. The method of claim 1, wherein the peaks in one peak cluster are detected according to weight distribution of peak amplitudes;
    wherein assigning one or more noise shaping pulse clusters to the detected signal peaks in one or more peak clusters according to the weight distribution of the peak amplitudes.

3. The method of claim 1, wherein a peak cluster comprises a peak with maximum peak amplitude and other peaks which are in vicinity of the peak with maximum peak amplitude.

4. The method of claim 1, wherein the method further comprising:
    performing a pre-channel filtering on the target signal to pre-suppress band edges before assigning one or more noise shaping pulse clusters to the detected signal peaks.

5. The method of claim 1, wherein the method further comprising:
    performing a post-channel filtering on the output signal to post-suppress band edges after assigning one or more noise shaping pulse clusters to the detected signal peaks.

6. The method of claim 4, wherein if the wireless communication system supports multicarrier, the method further comprising:
    splitting a multicarrier into multiple sub-carriers;
    assigning a separated pre-channel filtering and/or post-channel filtering to each of the sub-carriers;
    shifting the sub-carriers to corresponding offsets of frequency;
    combining multiple filtered sub-carriers into a filtered multicarrier.

7. The method of claim 1, wherein the method further comprises:
    comparing the output signal with the target signal to determine whether in-band and/or out-of-band quality meets a predetermined requirement in current iteration;
    adjusting filter coefficients of the noise shaping pulse cluster in next iteration when the requirement is not met.

8. The method of claim 1, wherein calculating an output signal based on the clipped signal peaks comprises:
    performing a delay on the target signal;

summing at least one clipped signal filtered by one or more noise shaping pulse clusters, thereby producing a summation;

subtracting the summation from the delayed target signal, so as to obtain the output signal.

9. The method of claim 1, wherein the bandwidth of a sub-noise-shaping pulse in one noise shaping pulse cluster is not overlapped with that of other noise shaping pulse cluster.

10. The method of claim 1, wherein configuration of the number of sub-noise shaping pulses in each noise shaping pulse cluster is symmetrical or asymmetrical.

11. An apparatus in a wireless communication system, the apparatus comprising:

a peak cluster detector, configured to detect multiple peaks of a target signal exceeding a predetermined threshold magnitude set to constitute one or more peak clusters;

multiple noise shaping pulse generators, configured to generate one or more noise shaping pulse clusters;

an allocator connected to the peak detector, configured to assign the one or more noise shaping pulse clusters in one or more peak clusters to clip the detected signal peaks in frequency domain;

a calculator, configured to calculate an output signal based on the clipped signal peaks;

wherein, the noise shaping pulse cluster comprises multiple sub-noise shaping pulses, bandwidths of the multiple sub-noise-shaping pulses are overlapped and a bandwidth of the noise shaping pulse cluster is greater than the bandwidth of the target signal.

12. The apparatus of claim 11, wherein the peak cluster detector configured to detect the peaks in one peak cluster according to weight distribution of peak amplitudes;

wherein the allocator further configured to assign one or more noise shaping pulse clusters to the detected signal peaks in one or more peak clusters according to the weight distribution of the peak amplitudes.

13. The apparatus of claim 11, wherein a peak cluster comprises a peak with maximum peak amplitude and other peaks which are in vicinity of the peak with maximum peak amplitude.

14. The apparatus of claim 11, wherein the apparatus further comprising:

a pre-channel filter connected to the peak detector, configured to perform pre-channel filtering on the target signal to pre-suppress band edges.

15. The apparatus of claim 11, wherein the apparatus further comprising:

a post-channel filter connected to the calculator, configured to perform post-channel filtering on the output signal to post-suppress band edges.

16. The apparatus of claim 14, wherein if the wireless communication system supports multicarrier, the apparatus further comprising:

a carrier splitter connected to the pre-channel filter, configured to split a multicarrier into multiple sub-carriers before performing pre-channel filtering on the target signal;

a carrier shifter connected to a post-channel filter, configured to shift the sub-carriers to corresponding offsets of frequency after performing post-channel filtering on the output signal;

a carrier combiner connected to the carrier shifter, configured to combine multiple sub-carriers into a multicarrier.

17. The apparatus of claim 11, wherein the bandwidth of a sub-noise-shaping pulse in one noise shaping pulse cluster is not overlapped with that of other noise shaping pulse cluster.

18. The apparatus of claim 11, wherein the apparatus further comprises:

a limiter connected to the calculator, configured to compare the output signal with the target signal to determine whether in-band and/or out-of-band quality meets a predetermined requirement in current iteration;

a scaling adjuster connected to the peak detector, configured to adjust filter coefficients of the noise shaping pulse cluster in next iteration when the requirement is not met.

19. The apparatus of claim 11, wherein the apparatus further comprises:

one or more windowing function generators, configured to generate one or more windowing function;

one or more multipliers, each configured to multiply a windowing function with a signal filtered by the noise shaping pulse cluster.

20. The apparatus of claim 11, wherein filter coefficients of sub-noise shaping pulses in the noise shaping pulse cluster are individually adjusted.

* * * * *